United States Patent [19]

Nagasaka

[11] 3,958,260
[45] May 18, 1976

[54] CAMERA INDICIA
[75] Inventor: Wataru Nagasaka, Tokyo, Japan
[73] Assignee: Canon Kabushiki Kaisha, Tokyo, Japan
[22] Filed: July 2, 1973
[21] Appl. No.: 375,464

[30] Foreign Application Priority Data
July 17, 1972 Japan.......................... 47-84157[U]

[52] U.S. Cl.................................. 354/288; 40/2.2; 150/52 J; 190/60; 354/202
[51] Int. Cl.²............................................ G03B 17/02
[58] Field of Search............... 95/11 R; 40/2 R, 310, 40/312, 2.2; 354/288, 202; 190/60; 156/247; 161/406; 150/52 J

[56] References Cited
UNITED STATES PATENTS
1,613,365 1/1927 Underwood........................ 95/11 R
2,142,470 1/1939 Claff................................ 40/312 X
2,805,816 9/1957 Morgan............................... 40/2 R
3,110,121 11/1963 Corrinet............................. 40/312

FOREIGN PATENTS OR APPLICATIONS
577,727 5/1946 United Kingdom.................. 190/60

Primary Examiner—L. T. Hix
Assistant Examiner—Kenneth C. Hutchison
Attorney, Agent, or Firm—Fitzpatrick, Cella, Harper & Scinto

[57] ABSTRACT

A line cut is marked in advance on a leather cover stuck on a camera, the size of the line cut area being accommodated with a size of a name plate or the like to be stuck on the camera so that a user of the camera may peel off the leather cover at the line cut portion so as to be able to easily stick the name plate at that portion without being peeled off and with good external appearance.

1 Claim, 3 Drawing Figures

CAMERA INDICIA

BACKGROUND OF THE INVENTION

1. Field of the Invention

The present invention relates to cameras, and more particularly to cameras of the type in which an indication plate may be easily stuck on a body of camera, or name may be easily written thereon.

2. Description of the Prior Art

It is known, in order to prevent a camera from being lost, that the owner himself ties a plate on which owner's name is written to a strap or a strap-ring of the camera or sticks a name plate made of plastic or the like on an outer wall of the camera. However, the plate merely tied may come off easily and the plate stuck may slightly projected out so that it may be easily peeled off when in use and having a bad effect on its external appearance.

SUMMARY OF THE INVENTION

According to this invention, a line cut is marked in a portion of the covering member stuck on the outer walls of the camera and the owner himself may peel off said line cut portion to stick thereat an indication plate on the outer wall of the camera. The invention has its object to allow the owner determine by choice to stick the indication plate or not, to have a good effect on external appearance when the indication plate is stuck or also when it is not stuck, and to provide the plate hard to be peeled off by external force.

One embodiment of the invention will now be described with reference to the accompanying drawings.

DESCRIPTION OF THE PREFERRED EMBODIMENT

Figure 1:
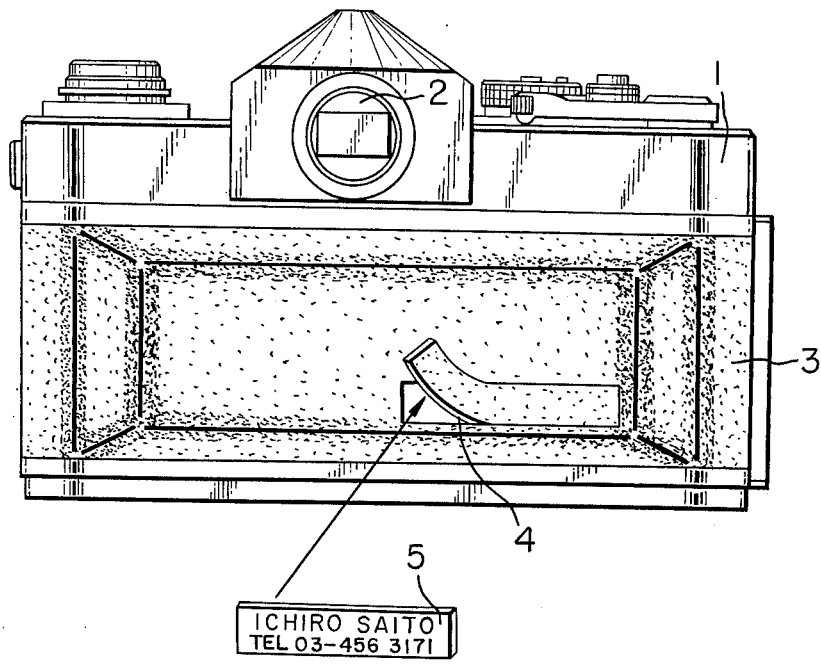
FIG. 1 is a view as viewed from back of the camera body, showing a line cut portion of crimp leather being peeled off.
Figure 2:
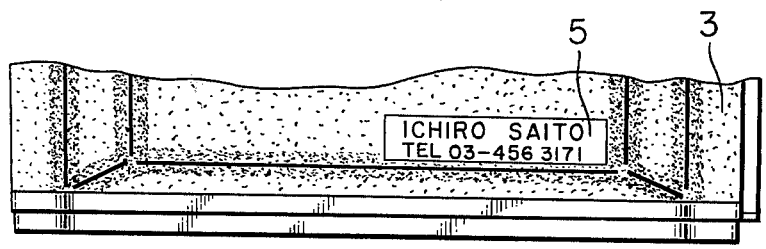
FIG. 2 is a view showing a name plate stuck thereon.

Turning now to FIG. 1, there are shown a top cover 1, a finder eyepiece 2, a back cover 3 hinged at the camera body with the crimp leather stuck on its whole surface, and a line cut 4 of continuous line or dotted line or the like marked in said crimp leather, this portion being stuck in a manner of being easily peeled off. Reference numeral 5 indicates a plate, on which owner's name is written, having thickness substantially similar to that of the crimp leather or somewhat thinner than said leather. A name plate stuck in accordance with the invention is shown in FIG. 2. As shown in FIG. 1, a portion marked with a line cut 4 is peeled off from the back cover 3 and the name plate 5 is stuck thereon. The measure of the line cut 4 is taken to be larger than the shape of the name plate to the extent of a fine amount. The name plate is made of such material that the surface thereof may be embossed with a name of owner or may be simply written with a pen and the like. A bonding surface between a part of the crimp leather, which is an area surrounded by a line cut, and the corresponding area of the back cover body may remain firstly uncoated with adhesives and said surface may then be coated with adhesives when the plate is stuck, or the inside of the plate may be precoated with adhesives to place the surface in the covering condition and the plate may be easily stuck merely by peeling off the covering when it is stuck. Or, adhesives to be coated under the line cut may be so treated that the plate is bonded by putting it immediately after the line cut portion of the leather cover has been peeled off. Further, it is advantageous that a material, on which owner may write-in name by a pen or the like, is pre-pasted on the inside of the crimp leather marked with a line cut so that the name may be written in immediately after the line cut portion 4 has been removed.

Figure 3:
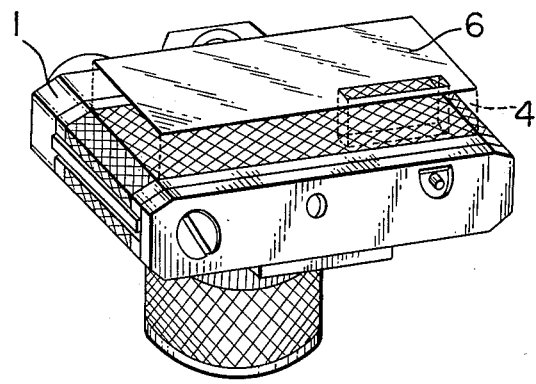
FIG. 3 is a perspective view showing a paper pattern placed on the camera.

Further, with respect to the line cut marked on the crimp leather, the line cut may be marked in the whole periphery, but for example a dotted line will be nice to look at in a case that a plate is not stuck. Further, in a case the plate is desired to be stuck by the provision of a line cut from the inside of the crimp leather by means of a press and the like to such extent that its cut does not reach the surface, a paper pattern 6 or the like is placed from the top as shown in FIG. 3 to determine the position of the line cut, facilitating removal by lifting a part of the line cut using an edge tool or the like.

While a name plate is stuck on the back cover of a still camera in the foregoing embodiment, the plate may similarly be stuck on any other places of the camera body wherever the crimp leather is covered.

According to the invention, a plate embossed with name and telephone number and sent to a particular client who returned a patron card is to be stuck by the owner simply by peeling off the crimp leather having a portion marked with a line cut. With this service, the rate of returning patron cards increases and it provides an effect as a medium to deepen the personal relationship between the client and the makers. Moreover, it is never worsened by appearance even if a plate is not stuck because of the owner's desire.

Further, the plate is so conveniently made that owner may write-in for himself marks of the like freely, and the plate when stuck will not project out from the surface of the covering, thus being hard to be peeled off and having a good effect on external appearance.

I claim:

1. A camera having leather secured to the outer walls thereof wherein said leather has a thickness substantially equal to that of a name plate to be attached to the camera, and comprises a portion for attaching said name plate, said portion being surrounded by a line cut of the same configuration as the name plate to permit a user to easily peel off said portion of the leather from the outer wall of the camera, and the name plate being attached to the peeled portion of the outer wall.

* * * * *

UNITED STATES PATENT AND TRADEMARK OFFICE
CERTIFICATE OF CORRECTION

PATENT NO. : 3,958,260
DATED : May 18, 1976
INVENTOR(S) : WATARU NAGASAKA

It is certified that error appears in the above-identified patent and that said Letters Patent are hereby corrected as shown below:

Column 2, line 53, cancel beginning with "1. A camera" to and including "of the outer wall." at line 61, and insert the following claim:

-- 1. In a camera of a type having leather bonded onto the outer wall of the back cover with an adhesive agent and a name plate of preselected size and shape is to be adhered thereonto, the improvement wherein said leather is of a thickness substantially equal to that of the name plate to be adhered to the camera, and has a portion surrounded by a line cut of the same size and shape as that of the name plate without the adhesive agent being applied thereto, and being so constructed and arranged that a user is able to easily peel off said portion of the leather from the back cover to adhere said name plate to the outer wall of the back cover exposed by the removal of said portion. --

Signed and Sealed this

Twenty-first Day of September 1976

[SEAL]

Attest:

RUTH C. MASON
*Attesting Officer*

C. MARSHALL DANN
*Commissioner of Patents and Trademarks*